United States Patent
Yue et al.

(10) Patent No.: US 12,381,817 B1
(45) Date of Patent: Aug. 5, 2025

(54) SERVICE DEMAND-DRIVEN ROUTING SCHEDULING AND DYNAMIC SELECTION METHOD AND SYSTEM FOR ACTIVE DISTRIBUTION NETWORK

(71) Applicant: NANJING UNIVERSITY OF POSTS AND TELECOMMUNICATIONS, Nanjing (CN)

(72) Inventors: Dong Yue, Nanjing (CN); Chaobin Song, Nanjing (CN); Bo Zhang, Nanjing (CN); Haiwen Wang, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 19/187,036

(22) Filed: Apr. 23, 2025

(30) Foreign Application Priority Data

Nov. 19, 2024 (CN) .......................... 202411650828.1

(51) Int. Cl.
*H04L 45/00* (2022.01)
*H04L 47/24* (2022.01)
(Continued)

(52) U.S. Cl.
CPC .............. *H04L 45/70* (2013.01); *H04L 47/24* (2013.01); *H04L 49/101* (2013.01); *H04W 40/02* (2013.01)

(58) Field of Classification Search
None
See application file for complete search history.

(56) References Cited

U.S. PATENT DOCUMENTS

2010/0329119 A1* 12/2010 Zorba Barah ....... H04W 72/543
370/235
2017/0264749 A1* 9/2017 Wu ........................ H04W 24/08

FOREIGN PATENT DOCUMENTS

| CN | 110971525 A | 4/2020 |
| CN | 112202597 A | 1/2021 |

(Continued)

OTHER PUBLICATIONS

First Office Action issued in counterpart Chinese Patent Application No. 202411650828.1, dated Dec. 19, 2024.
(Continued)

*Primary Examiner* — Xavier S Wong
(74) *Attorney, Agent, or Firm* — Westbridge IP LLC

(57) ABSTRACT

Disclosed are a service demand-driven routing scheduling and dynamic selection method and system for active distribution network. The method includes: evaluating a physical importance index and an information importance index of each service traffic according to a physical influence and an information demand of each issued service traffic, comprehensively taking into account the physical importance index and the information importance index to obtain a comprehensive importance index, and ranking the comprehensive importance index to obtain a ranked service traffic set; quantizing the real-time performance and the reliability of a route link and generating a route distance matrix; inputting the ranked service traffic set and the route distance matrix into a route scheduling optimization model, and generating a route scheduling scheme of the overall service traffic based on a principle of service traffic importance and route path performance matching.

5 Claims, 5 Drawing Sheets

(51) Int. Cl.
    *H04L 49/101*    (2022.01)
    *H04W 40/02*    (2009.01)

(56) References Cited

FOREIGN PATENT DOCUMENTS

| CN | 112333109 A | 2/2021 |
|---|---|---|
| CN | 112423400 A | 2/2021 |
| CN | 112867089 A | 5/2021 |
| CN | 115622902 A | 1/2023 |
| CN | 117118885 A | 11/2023 |
| CN | 117714365 A | 3/2024 |
| CN | 118074241 A | 5/2024 |
| CN | 118317388 A | 7/2024 |
| CN | 118677829 A | 9/2024 |

OTHER PUBLICATIONS

Huang et al., Wind-Thermal power generation scheduling with predictive transmission security margin, International Journal of Electrical Power and Energy Systems, 2022, No. 141, pp. 1-12, dated Oct. 31, 2022.

Notification to Grant Patent Right for Invention issued in counterpart Chinese Patent Application No. 202411650828.1, dated Feb. 18, 2025.

Wei, Research on Highly Reliable Routing Algorithm for Multi-Service QoS Guarantee in Distribution Field Area Network, Master's Thesis submitted to Nanjing University of Posts and Telecommunications, dated May 15, 2024.

\* cited by examiner

SERVICE DEMAND-DRIVEN ROUTING SCHEDULING AND DYNAMIC SELECTION METHOD AND SYSTEM FOR ACTIVE DISTRIBUTION NETWORK

CROSS-REFERENCE TO RELATED APPLICATIONS

The application claims priority to Chinese Patent Application No. 202411650828.1, filed on Nov. 19, 2024, which is incorporated herein by reference in its entirety.

TECHNICAL FIELD

The present disclosure relates to a service demand-driven routing scheduling and dynamic selection method and system for an active distribution network, and belongs to the technical field of active distribution network control.

BACKGROUND

In recent years, with the increasingly prominent energy shortage and environmental problems, the new energy power generation technology has developed rapidly. A large number of new energy power generation devices are connected to the power grid in the form of Distributed generation (DG), which not only relieves the pressure on the power grid, but also brings challenges to the distribution network in terms of power quality, planning, operation and control. In order to cope with the above challenges, people have applied various active control strategies to alleviate these problems, so that the traditional distribution network gradually evolves to the Active Distribution Network (ADN). The active distribution network uses the mode of actively managing distributed generation, energy storage devices and bidirectional loads of customers, which is a public distribution network with a flexible topology. The control technology increases and complicates the dependence of a physical system on an information system, so that the active distribution network becomes a Cyber-Physical Power System (CPPS).

There are many regulation services in the active distribution network, such as voltage regulation, frequency regulation and demand response. These services are generated in the control center and are issued by the information system after being scheduled by the control center in a unified manner, so as to regulate the physical system in real time, thus maintaining the safe and stable operation of the active distribution network, providing users with a high-quality power supply, and providing reliable guarantee for the national economy while meeting the electricity demand of users.

However, on the one hand, due to different specific demands of multi-regulation services in the active distribution network (such as emergency services such as relay protection and safety control pay more attention to the real-time performance, while economic services such as power consumption information acquisition and office automation pay more attention to the reliability) and the large number of services, how to coordinate the routing and forwarding of different service traffics based on service demands and provide appropriate route paths for service traffics with different needs, so as to meet the real-time performance and the reliability of multi-service traffic transmission, has become an urgent problem to be solved. On the other hand, the stability of the physical system and the quality of service of users depend on the real-time and accurate transmission of regulation instructions. As a typical CPPS, the data transmission performance of the active distribution network strongly depends on the normal operation of the information system. Once the information system fails, resulting in the regulation instructions being unable to be issued in time, this will seriously affect the stability of the physical system and even bring cause to the national economy. Therefore, how to ensure the real-time transmission of the regulation instructions when some route communication links suddenly fail due to network attacks or natural disasters is very important for improving the robustness of the active distribution network and ensuring the safe and stable operation of the system.

Therefore, that present disclosure design a service demand-driven routing scheduling and dynamic selection method and device for an active distribution network, which not only can satisfy different demands of multi-regulation services and generate an optimal traffic scheduling scheme, thereby ensuring the real-time reliable transmission of the traffic, but also can respond to sudden failures of communication links and quickly re-select route paths.

SUMMARY

The purpose of the present disclosure is to overcome the shortcomings of the prior art, and to provide a service demand-driven routing scheduling and dynamic selection method and system for an active distribution network, so as to solve the problem of ensuring the real-time and reliable transmission of the multi-service traffic according to different regulation service demands in a cyber-physical scene, as well as the problem of rapid route path reconstruction in the event of sudden link failures.

In order to achieve the above objectives/solve the above technical problems, the present disclosure is achieved by using the following technical scheme.

In a first aspect, the present disclosure provides a service demand-driven routing scheduling and dynamic selection method for active distribution network, where the method includes:
  evaluating a physical importance index and an information importance index of each service traffic according to a physical influence and an information demand of each issued service traffic;
  comprehensively taking into account the physical importance index and the information importance index to obtain a comprehensive service traffic importance index;
  ranking the comprehensive service traffic importance index to obtain a ranked service traffic set;
  quantizing the real-time performance and the reliability of each route link and generating a route distance matrix;
  inputting the ranked service traffic set and the route distance matrix into a pre-constructed route scheduling optimization model, and generating an optimal route scheduling scheme of the overall service traffic based on a principle of service traffic importance and route path performance matching;
  scheduling, by a lower router, the traffic according to the optimal route scheduling scheme.

Optionally, evaluating a physical importance index and an information importance index of each service traffic according to a physical influence and an information demand of each issued service traffic includes:
  using an improved gravity centrality method to evaluate a physical importance, where an original gravity centrality formula is:

$$G(i) = \sum_{j \in N_i} \frac{ks(i)ks(j)}{d_{ij}} \quad (1)$$

where G(i) denotes an obtained node influence index, ks(i) denotes a k-shell value of a physical node i, ks(j) denotes a k-shell value of a physical node j, the k-shell value denotes the influence in the network topology, $N_i$ denotes a neighboring node set of a physical node i, and $d_{ij}$ denotes a topological distance between the physical nodes i and j;

improving the formula (1), and obtaining an improved gravity centrality formula:

$$G_p(i) = \sum_{j \in N_i} \frac{p_{i,norm}ks(i) \cdot p_{j,norm}ks(j)}{d_{ij}} \quad (2)$$

where $G_p(i)$ denotes an obtained physical node importance value, $p_{i,norm}$ denotes a power influence of the normalized traffic on the physical node i, $p_{i,norm}ks(i)$ denotes a comprehensive index of the structural influence and the physical influence of the node i in a network topology, $p_{j,norm}$ denotes a power influence of the normalized traffic on the physical node j, and $p_{j,norm}ks(j)$ denotes a comprehensive index of the structural influence and the physical influence of the node j in the network topology;

referring to formula (3) for the method of normalizing all variables to be normalized:

$$c_{norm} = (1 - X)\left(\frac{c - c_{min}}{c_{max} - c_{min}}\right) + X \quad (3)$$

where $c_{norm}$ denotes a normalized variable value, c denotes the variable to be normalized, $c_{min}$ denotes a minimum value of the variable c, $c_{max}$ denotes a maximum value of the variable c, and X denotes the corrected parameter;

using the improved gravity centrality formula (2) to denote the physical importance $I_p(k)$ of the service traffic $f_k$, as shown in formula (4):

$$I_p(k) = G_p(i) \quad (4)$$

taking into account the specific real-time demand and reliability demand of different service traffics, constructing a traffic information importance formula (5):

$$I_c(k) = \alpha_1 \frac{1}{\tau_{k,norm}} + \alpha_2 \frac{1}{e_{k,norm}} \quad (5)$$

where k denotes the number of the service traffic, $I_c(k)$ denotes the information importance index of the traffic, $\tau_{k,norm}$ denotes a normalized deadline demand of the traffic, $e_{k,norm}$ denotes a normalized bit error rate demand of the traffic, $\alpha_1$ and $\alpha_2$ denote weight coefficients which satisfy $\alpha_1 + \alpha_2 = 1$.

Optionally, comprehensively taking into account the physical importance index and the information importance index to obtain a comprehensive service traffic importance index includes:

based on a traffic physical importance $I_p(k)$ (4) and a traffic information importance (5), giving an information physical comprehensive importance index (6) of the service traffic $f_k$:

$$I_k = \beta_1 I_p(k) + \beta_2 I_c(k) \quad (6)$$

where $I_k$ denotes a comprehensive importance of each traffic taking into account both the physical importance and the information importance, and $\beta_1$ and $\beta_2$ denote weight coefficients which satisfy $\beta_1 + \beta_2 = 1$;

arranging the traffics in a traffic set to be scheduled F in a descending order according to the comprehensive importance $I_k$ of each traffic to obtain a ranked traffic set.

Optionally, quantizing the real-time performance and the reliability of each route link and generating a route distance matrix includes:

abstracting an actual router as a communication node, and abstracting a link between two communication nodes as a connecting edge, where the communication topology is denoted as G={V,E}, V={$u_1, u_2, \ldots, u_n$} denotes a communication node set, $u_n$ denotes an n-th communication node, E={$l_{ij}|i \neq j$} denotes a communication link set, $l_{ij}$ denotes a communication link between nodes i and j, an adjacency matrix A=$[a_{ij}]_{n \times n}$ of the communication network is obtained according to the communication network topology, and when the communication nodes i and j are communicated with each other directly, $a_{ij}=1$, otherwise $a_{ij}=0$; $a_{ij}$ denotes the connectivity between nodes i and j, and n denotes a matrix dimension;

each communication link $l_{ij}$ has a link state attribute: an available link bandwidth $b_{ij}$, a link transmission delay $\tau_{ij}$ and a link transmission bit error rate $e_{ij}$, and each route link is evaluated taking into account the transmission delay and the bit error rate in the link state, and the evaluation method is shown in formula (7):

$$\text{distance}_{ij} = \begin{cases} w_1 \tau_{ij,norm} + w_2 e_{ij,norm}, & a_{ij} = 1 \\ \inf, & a_{ij} = 0 \end{cases} \quad (7)$$

where distance$_{ij}$ denotes an evaluation value of each link, $\tau_{ij,norm}$ denotes a link transmission delay normalized by formula (3), $e_{ij,norm}$ denotes a link bit error rate normalized by formula (3), $w_1$ and $w_2$ denote weight coefficients which satisfy $w_1 + w_2 = 1$, inf denotes infinity, and the smaller the value distance$_{ij}$, the better the performance of the link;

calculating the route distance matrix D=$[\text{distance}_{ij}]_{n \times n}$ according to formula (7) and the adjacency matrix A of the communication network.

Optionally, the method further includes:

when a traffic is scheduled, a communication node where the traffic is located having a link failure, so that an original route path is unavailable, where at this time, a current communication node acquires real-time link failure information, regards a failed link $l_{ij}$ as unreachable, and modifies a corresponding element $a_{ij}=0$ in the adjacency matrix A and a corresponding element distance$_{ij}$=inf in a route distance matrix;

re-selecting an optimal path based on service traffic importance and route path performance matching, so as to achieve rapid reconstruction of a failed path;

where taking into account that an original route scheduling result is not completely unavailable, dynamic selection of a path is only carried out at the failed link, and a complete route path is incapable of being formed, an optimal scheduling result is combined with a reconstruction result to re-form a complete route path from a source node to a destination node of the service traffic, the complete route path is fed back to a control center, and an optimal scheduling route table S is updated.

Optionally, the route scheduling optimization model aims at minimizing an average transmission delay and a bit error rate of all traffics, and is constructed with constraints of a deadline, a bit error rate, a communication bandwidth and a node queue of the service traffic.

Optionally, the route scheduling optimization model has an objective function of:

$$\min \frac{1}{|F|} \sum_{f_k \in F} (o_1 \tau_{k,total} + o_2 e_{k,total}) \quad (8)$$

where $|F|$ denotes the number of traffics in the traffic set to be scheduled, $\tau_{k,total}$ denotes a total transmission delay of the service traffic $f_k$ on a complete route path, $e_{k,total}$ denotes a total bit error rate of the service traffic $f_k$ on a complete route path, and $o_1$ and $o_2$ denote weight coefficients which satisfy $o_1 + o_2 = 1$;

the total delay and the total bit error rate of the service traffic on a complete route path are (9) and (10), respectively:

$$\tau_{k,total} = \sum_{l_{ij} \in path_k} \tau_{ij} \quad (9)$$

$$e_{k,total} = 1 - \prod_{l_{ij} \in path_k} (1 - e_{ij}) \quad (10)$$

where $l_{ij}$ denotes a link, $path_k$ denotes a complete route path of the service traffic $f_k$, $f_k$ denotes a k-th traffic to be scheduled, and F denotes a traffic set to be scheduled;

a transmission delay constraint of the service traffic is (11): each traffic arrives within the deadline;

$$\tau_{k,total} \leq \tau_k, \forall f_k \in F \quad (11)$$

where $\tau_k$ denotes a deadline of the service traffic;

a bit error rate constraint of the service traffic is (12): each traffic ensures that the total bit error rate does not exceed an allowable maximum bit error rate;

$$e_{k,total} \leq e_k, \forall f_k \in F \quad (12)$$

where $e_k$ denotes an allowable maximum bit error rate of the service traffic;

a communication link bandwidth constraint is (13): the total traffic accommodated by each link does not exceed the available link bandwidth;

$$\sum_{f_k \in F} x_k^{ij} \cdot b_k \leq b_{ij}, \forall l_{ij} \in E \quad (13)$$

where $x_k^{ij}$ denotes an indicator indicating whether the service traffic $f_k$ passes through the communication link $l_{ij}$, when the service traffic $f_k$ passes through the communication link $l_{ij}$, $x_k^{ij}=1$, otherwise, $x_k^{ij}=0$, $b_k$ denotes a bandwidth required for traffic transmission, and $b_{ij}$ denotes a total bandwidth of the link $l_{ij}$;

a communication node queue constraint is (14): a length of a traffic queue in each communication node does not exceed the allowable maximum queue value;

$$\sum_{f_k \in F} v_k^i \leq q_{i,max}, \forall v_i \in V \quad (14)$$

where $u_k^i$ denotes an indicator indicating whether the service traffic $f_k$ passes through the communication node i, when the service traffic $f_k$ passes through the communication node $u_i$, $u_k^i=1$, otherwise, $u_k^i=0$, $q_{i,max}$ denotes a maximum traffic storage queue of the communication node i.

Optionally, inputting the ranked service traffic set and the route distance matrix into a pre-constructed route scheduling optimization model, and generating an optimal route scheduling scheme of the overall service traffic based on a principle of service traffic importance and route path performance matching includes:

solving a shortest path by a Floyd algorithm for each service traffic $f_k$ according to the principle of service traffic importance and route path performance matching, and generating a current minimum distance route path for the service traffic with a high importance;

judging a constraint condition of generating the current minimum distance route path, keeping the path satisfying the constraint in a route table, updating the route distance matrix, otherwise, considering that traffic scheduling fails, until all the traffics in the traffic set are scheduled, and obtaining the optimal route scheduling scheme.

In a second aspect, the present disclosure provides a service demand-driven routing scheduling and dynamic selection system for an active distribution network, where the system includes:

a traffic importance evaluation module, which is configured to evaluate a physical importance index and an information importance index of each service traffic according to a physical influence and an information demand of each issued service traffic;

a fusion module, which is configured to comprehensively take into account the physical importance index and the information importance index to obtain a comprehensive service traffic importance index;

a service traffic set module, which is configured to rank the comprehensive service traffic importance index to obtain a ranked service traffic set;

a route link quantization module, which is configured to quantize the real-time performance and the reliability of each route link and generate a route distance matrix;

a route optimization generation module, which is configured to input the ranked service traffic set and the route distance matrix into a pre-constructed route scheduling optimization model, and generate an optimal route scheduling scheme of the overall service traffic based on a principle of service traffic importance and route path performance matching;

a traffic scheduling module, which is configured to schedule, by a lower router, the traffic according to the optimal route scheduling scheme.

Optionally, the system further includes:

a route dynamic selection module, which is configured to dynamically select a route path based on real-time link failure information and an original optimization scheme when there is a link failure.

Compared with the prior art, the present disclosure has the following beneficial effects.

Firstly, according to the method of evaluating the information physical comprehensive importance of the service traffic provided by the present disclosure, the physical traffic importance index and the information importance index are comprehensively taken into account to obtain a comprehensive importance index, so that the problem that service traffic evaluation in a cyber-physical scene is solved.

Secondly, in the present disclosure, a method for route optimization scheduling base on the principle of service traffic importance and route path performance matching is proposed, which solve the problem that it is difficult to schedule the multi-service traffic on demand.

Lastly, in the present disclosure, a method for route dynamic selection base on real-time link failure information and an original optimization scheme provided by the present disclosure can quickly re-select the available path at the node of the failed link, and the reconstruction result can satisfy the transmission demand of the traffic, thus solving the problem of ensuring the transmission of the service traffic on demand in the event of sudden link failures.

DETAILED DESCRIPTION OF THE EMBODIMENTS

Figure 1:
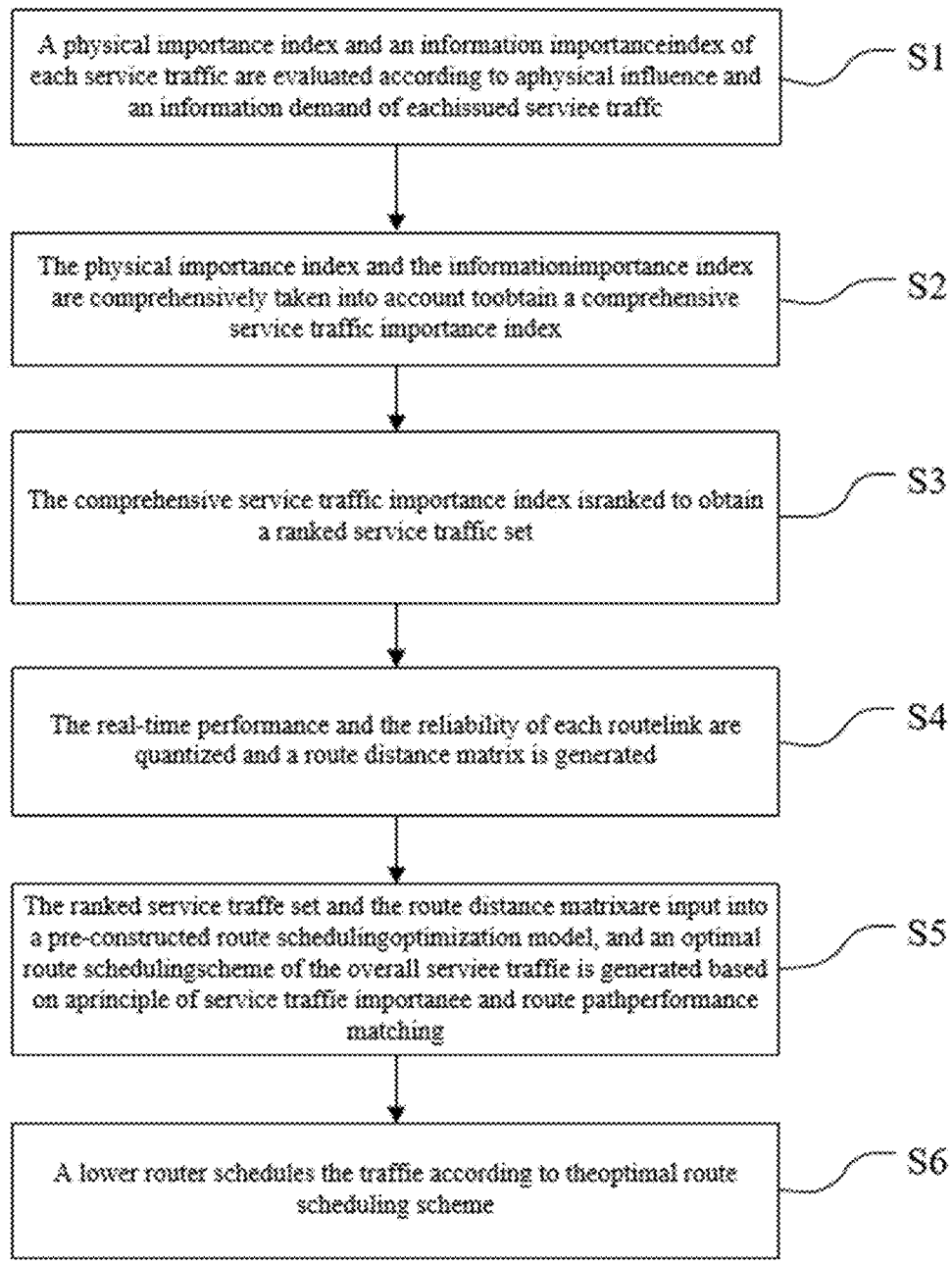
FIG. 1 is a flow chart of an embodiment of a service demand-driven routing scheduling and dynamic selection method for an active distribution network according to the present disclosure.

In order to make the technical means, the creative features, the goals and the effects of the present disclosure understandable, the present disclosure will be further described in detail with reference to the detailed description.

In the description of the present disclosure, it should be understood that the orientational or positional relationships indicated by the terms such as "center", "longitudinal", "transverse", "upper", "lower", "front", "rear", "left", "right", "vertical", "horizontal", "top", "bottom", "inside" and "outside" are based on the orientational or positional relationships shown in the drawings only for the convenience of describing the present disclosure and simplifying the description, rather than indicate or imply that the referred devices or elements must have a specific orientation, be constructed and operated in a specific orientation, and therefore should not be construed as limiting the present disclosure. In addition, the terms such as "first" and "second" are only used for the purpose of description, and cannot be understood as indicating or implying relative importance or implicitly indicating the number of indicated technical features. Thus, the features defined as "first", "second" and so on may explicitly or implicitly include one or more of these features. In the description of the present disclosure, unless otherwise specified, "a plurality of" means two or more.

In the description of the present disclosure, it should also be noted that unless otherwise specified and defined expressly, the terms such as "mount", "link" and "connect" should be understood broadly, for example, it can be fixed connection, detachable connection or integral connection; or mechanical connection or electrical connection; or direct connection or indirect connection through an intermediate medium or communication between two elements. For those skilled in the art, the specific meanings of the above terms in the present disclosure can be understood according to specific situations.

In Embodiment 1, the present disclosure designs a schematic diagram of an execution flow of a cyber-physical architecture of an active distribution network and a method thereof. The architecture includes a top control center, a management terminal, a middle-layer route communication network and a bottom physical power node. The control center acquires the service demand of the management terminal and the topology and traffic information of the route communication nodes, and generates the optimal route scheduling scheme. The route communication node acquires real-time failed link information and makes dynamic selection. The details are as follows.

Figure 2:
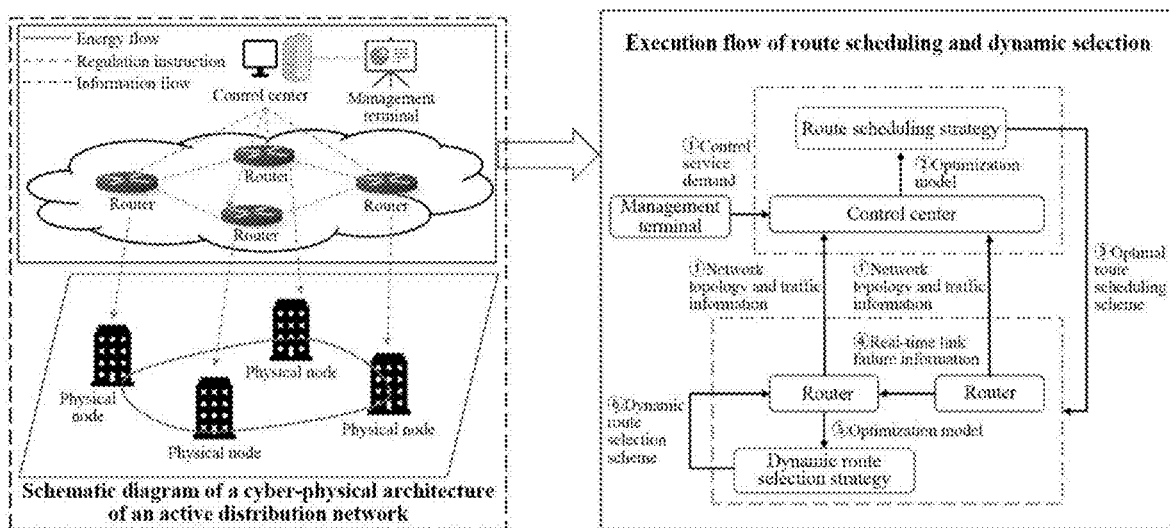
FIG. 2 is a schematic diagram of an execution flow of a cyber-physical architecture of an active distribution network and a method thereof according to the present disclosure.

As shown in FIG. 1 and FIG. 2, a service demand-driven routing scheduling and dynamic selection method for an active distribution network is provided, where the method includes.

S1, a physical importance index and an information importance index of each service traffic are evaluated according to a physical influence and an information demand of each issued service traffic.

S2, the physical importance index and the information importance index are comprehensively taken into account to obtain a comprehensive service traffic importance index.

S3, the comprehensive service traffic importance index is ranked to obtain a ranked service traffic set.

S4, the real-time performance and the reliability of each route link are quantized and a route distance matrix is generated.

S5, the ranked service traffic set and the route distance matrix are input into a pre-constructed route scheduling optimization model, and an optimal route scheduling scheme of the overall service traffic is generated based on a principle of service traffic importance and route path performance matching.

S6, scheduling, by a lower router, the traffic according to the optimal route scheduling scheme.

For S1, when a plurality of types of regulation services are generated in the control center, it is necessary to comprehensively evaluate the influence of different traffics on the transmission information demand (the real-time performance and the reliability) and on the physical system. The system objects actually involved in power regulation services are abstracted as physical nodes with power attributes. Taking k traffics generated by the control center as an example, the overall traffic set is denoted as F. Each service traffic $f_k$ to be scheduled can be denoted as $f_k=\{src_k, des_k, b_k, \tau_k, e_k, P_k, I_k\}$, where $src_k$ and $des_k$ denote the source node and the destination node of the traffic, respectively. $b_k$ denotes a bandwidth required for traffic transmission. The traffic has a deadline demand $\tau_k$ and a bit error rate demand $e_k$. $P_k$ denotes a power influence vector $P_k=[p_1, p_2, \ldots, p_n]$ generated by the traffic finally acting on the physical node. $p_i$ denotes a power influence on the i-th physical node, and $I_k$ denotes the comprehensive importance of the traffic. Taking into account the above service demands and the impacts comprehensively, the following evaluation process is designed.
1) An improved gravity centrality method is used to evaluate a physical importance, where an original gravity centrality formula is:

$$G(i) = \sum_{j \in N_i} \frac{ks(i)ks(j)}{d_{ij}} \quad (1)$$

where ks(i) denotes a k-shell value of a physical node i, $N_i$ denotes a neighboring node set of a physical node i, and $d_{ij}$ denotes a topological distance between the physical nodes i and j. The formula (1) not only can reflect the importance of node in the network topology, but also take into account the importance of neighboring nodes, which can better reflect the comprehensive importance of the node.

Since the object of the regulation service is the physical node, the improved gravity centrality formula (2) is obtained by taking into account the influence of different service traffics on the physical system:

$$G_p(i) = \sum_{j \in N_i} \frac{p_{i,norm}ks(i) \cdot p_{j,norm}ks(j)}{d_{ij}}; \quad (2)$$

where $p_{i,norm}$ denotes a power influence of the normalized traffic on the physical node i, which not only takes into account the topological importance of the node, but also takes into account the functional importance of the node from the perspective of the actual power grid physical system.

The normalization method is shown in formula (3):

$$c_{norm} = (1-X)\left(\frac{c - c_{min}}{c_{max} - c_{min}}\right) + X \quad (3)$$

where X denotes the corrected parameter, which prevents 0 after normalization.

The improved gravity centrality formula (2) is used to denote the physical importance $I_p(k)$ of the service traffic $f_k$, as shown in formula (4):

$$I_p(k) = G_p(i) \quad (4)$$

2) Taking into account the specific real-time demand and reliability demand of different service traffics, a traffic information importance formula (5) is constructed:

$$I_c(k) = \alpha_1 \frac{1}{\tau_{k,norm}} + \alpha_2 \frac{1}{e_{k,norm}} \quad (5)$$

where $\tau_{k,norm}$ and $e_{k,norm}$ denote a normalized deadline demand and a normalized bit error rate demand of the traffic, respectively, $\alpha_1$ and $\alpha_2$ denote weight coefficients which satisfy $\alpha_1 + \alpha_2 = 1$.

(3) Based on a traffic physical importance (4) and a traffic information importance (5), an information physical comprehensive importance index of the service traffic $f_k$ is given as shown in formula (6):

$$I_k = \beta_1 I_p(k) + \beta_2 I_c(k) \quad (6)$$

where $\beta_1$ and $\beta_2$ denote weight coefficients which satisfy $\beta_1 + \beta_2 = 1$. Through the weighted sum form of formula (6), the physical traffic importance index and the information importance index are comprehensively taken into account to obtain the comprehensive importance index.

For S3, the traffics in a traffic set to be scheduled F are arranged in a descending order according to the comprehensive importance $I_k$ of each traffic (the larger $I_k$, the more important the service traffic). The service traffic set is generated in the control center at the beginning. The arrangement here is to rank the traffics in the initial traffic set to obtain a ranked service traffic set.

For S4, after S3 is completed, it is necessary to quantize the real-time performance and the reliability of each route link $l_{ij}$ and generate a route distance matrix. The specific process is as follows.

1) An actual router is abstracted as a communication node. A link between two communication nodes is abstracted as a connecting edge. The communication topology can be denoted as G={V,E}. V={$u_1, u_2, \ldots, u_n$} denotes a communication node set. E={$l_{ij}|i \neq j$} denotes a communication link set. An adjacency matrix A=$[a_{ij}]_{n \times n}$ of the communication network can be obtained according to the communication network topology. When the communication nodes i and j can be communicated with each other directly, $a_{ij}=1$, otherwise $a_{ij}=0$.

2) Each communication link $l_{ij}$ has a link state attribute: an available link bandwidth $b_{ij}$, a link transmission delay $\tau_{ij}$ and a link transmission bit error rate $e_{ij}$. Since there is no bandwidth index for evaluating the service traffic, each route link is evaluated taking into account the transmission delay and the bit error rate in the link state, and the evaluation method is shown in formula (7):

$$distance_{ij} = \begin{cases} w_1 \tau_{i,j,norm} + w_2 e_{ij,norm}, & a_{ij} = 1 \\ inf, & a_{ij} = 0 \end{cases} \quad (7)$$

where $\tau_{ij,norm}$ and $e_{ij,norm}$ denote a link transmission delay and a link bit error rate normalized by formula (3), respectively. $w_1$ and $w_2$ denote weight coefficients which satisfy $w_1 + w_2 = 1$. inf denotes infinity, that is, there is no direct communication link between the communication nodes i and j. The smaller the value $distance_{ij}$, the better the performance of the link. The route distance matrix D=$[distance_{ij}]_{n \times n}$ is calculated according to formula (7) and the adjacency matrix A of the communication network.

The ranked service traffic set F and the route distance matrix A generated in S5 are used as the inputs of the route scheduling algorithm. A route scheduling scheme of the overall traffic is generated in the control center according to the principle of "service traffic importance and route path performance matching". Satisfying different service demands in the active distribution network is the basic condition to maintain the safe and stable operation of the system. At the same time, in order to further improve the control performance of the system and the service quality of users, all the traffics should be allocated to the corresponding optimal links according to the importance of the traffics. However, taking into account the limitation of the actual communication environment resources, the above operation cannot be achieved. Therefore, the route optimization scheduling under the constraint conditions should be taken into account, and the fast route algorithm is used to schedule the traffic. The specific steps are as follows.

1) In order to satisfy the demand of multi-regulation services in the active distribution network, the limited bandwidth resources of the communication link and the limited storage queue resources of the communication nodes in the actual communication network scene are taken into account at the same time. The route scheduling optimization models (8) to (14) aim at minimizing an average transmission delay and a bit error rate of all traffics, and are constructed with constraints of a deadline, a bit error rate, a communication bandwidth and a node queue of the service traffic. The objective function (8) is:

$$\min \frac{1}{|F|} \sum_{f_k \in F} (o_1 \tau_{k,total} + o_2 e_{k,total}) \quad (8)$$

where $\tau_{k,total}$ denotes a total transmission delay of the service traffic $f_k$ on a complete route path, $e_{k,total}$ denotes a total bit error rate of the service traffic $f_k$ on a complete route path, and $o_1$ and $o_2$ denote weight coefficients which satisfy $o_1+o_2=1$.

The total delay and the total bit error rate of the service traffic $f_k$ on a complete route path are (9) and (10), respectively:

$$\tau_{k,total} = \sum_{l_{ij} \in path_k} \tau_{ij} \quad (9)$$

$$e_{k,total} = 1 - \prod_{l_{ij} \in path_k} (1 - e_{ij}) \quad (10)$$

where $path_k$ denotes a complete route path of the traffic $f_k$.

A transmission delay constraint of the service traffic is (11): each traffic arrives within the deadline;

$$\tau_{k,total} \leq \tau_k, \forall f_k \in F \quad (11)$$

where $\tau_k$ denotes a deadline of the service traffic.

A bit error rate constraint of the service traffic is (12): each traffic ensures that the total bit error rate does not exceed an allowable maximum bit error rate;

$$e_{k,total} \leq e_k, \forall f_k \in F \quad (12)$$

where $e_k$ denotes an allowable maximum bit error rate of the service traffic.

A communication link bandwidth constraint is (13): the total traffic accommodated by each link does not exceed the available link bandwidth;

$$\sum_{f_k \in F} x_k^{ij} \cdot b_k \leq b_{ij}, \forall l_{ij} \in E \quad (13)$$

where when the service traffic $f_k$ passes through the communication link $l_{ij}$, $x_k^{ij}=1$, otherwise, $x_k^{ij}=0$, $b_k$ denotes a bandwidth required for traffic transmission, and $b_{ij}$ denotes a total bandwidth of the link $l_{ij}$.

A communication node queue constraint is (14): a length of a traffic queue in each communication node (router) does not exceed the allowable maximum queue value;

$$\sum_{f_k \in F} v_k^i \leq q_{i,max}, \forall v_i \in V \quad (14)$$

where when the service traffic $f_k$ passes through the communication node $u_i$, $u_k^i=1$, otherwise, $u_k^i=0$, $q_{i,max}$ denotes a maximum traffic storage queue of the communication node i.

2) In order to guarantee the real-time transmission of the regulation service instructions, not only a fast route path needs to be allocated to the traffic, but also the control center needs to quickly use the fast route scheduling algorithm to generate the route scheduling scheme. Therefore, the present disclosure uses a Floyd algorithm for route scheduling.

The Floyd algorithm is an algorithm that uses a dynamic panning idea to find the shortest path between multi-source points in a given weighted graph. First, the ranked traffic set F and the route distance matrix A generated in S2 are used as the inputs of the Floyd algorithm. Second, a shortest path is solved by the Floyd algorithm for each service traffic $f_k$ according to the principle of "service traffic importance and route path performance matching", and the route path with a short distance (high performance) is assigned to the service traffic with a high importance. Thereafter, a constraint condition of the generated route path is judged, the path satisfying the constraint is kept in a route table, the route distance matrix is updated, otherwise, it is considered that traffic scheduling fails. Finally, the above process is repeated until all the traffics in the traffic set F are scheduled and the final scheduling result is returned. It should be noted here that the directly generated scheme, for example, the traffic fl changes from a→d, and the result is [a, b, c, d]. A path is generated for each traffic according to the sequence.

The algorithm pseudo-code is as follows:

| Floyd route optimization scheduling pseudo-code |
|---|
| Input: the ranked service traffic set F and the route distance matrix D |
| Output: the route table S of the traffic to be scheduled |
| 1: For $f_k$ in F: |
| 2: $path_k \leftarrow$ Floyd ($f_k$, D) |
| 3: if $path_k$ satisfies (8)-(14): |
| 4: S← $path_k$ |
| 5: update A |
| 6: else: |
| 7: $f_k$ is failed |
| 8: end if |
| 9: end For |
| 10: return S |

Figure 3:
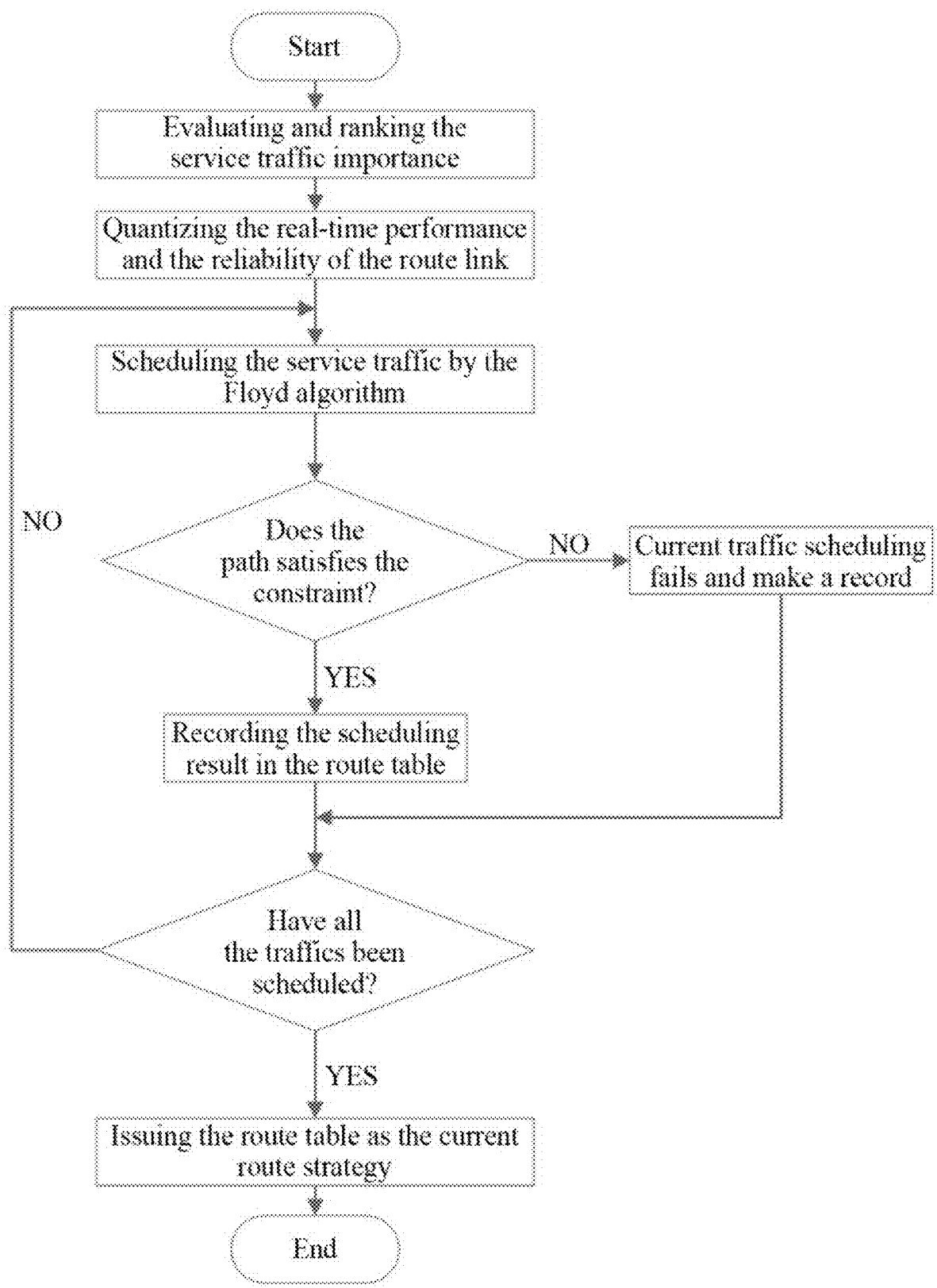
FIG. 3 is a flow chart of a route optimization scheduling algorithm according to the present disclosure.
Figure 4:
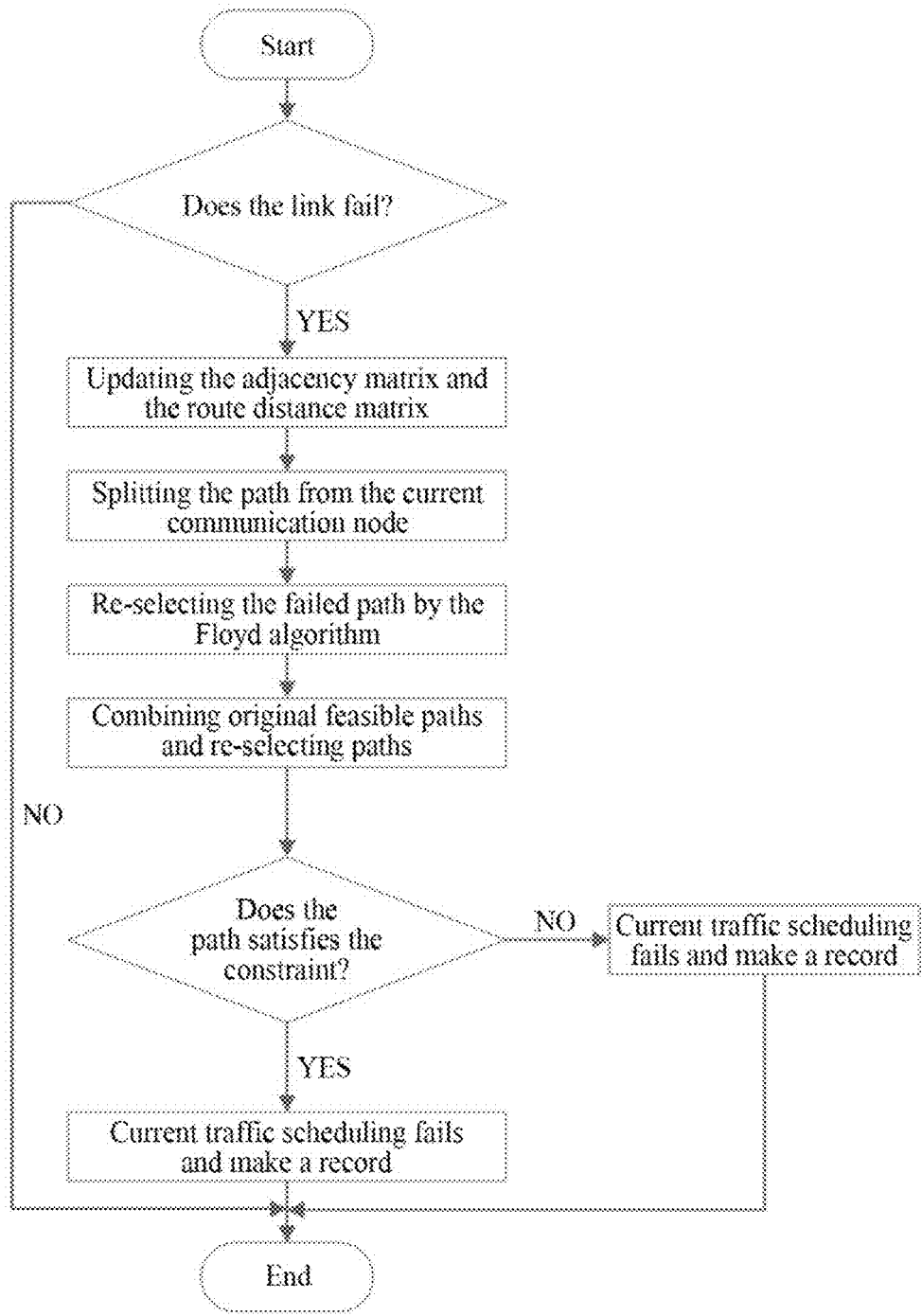
FIG. 4 is a flow chart of a route dynamic selection algorithm according to the present disclosure.
Figure 5:
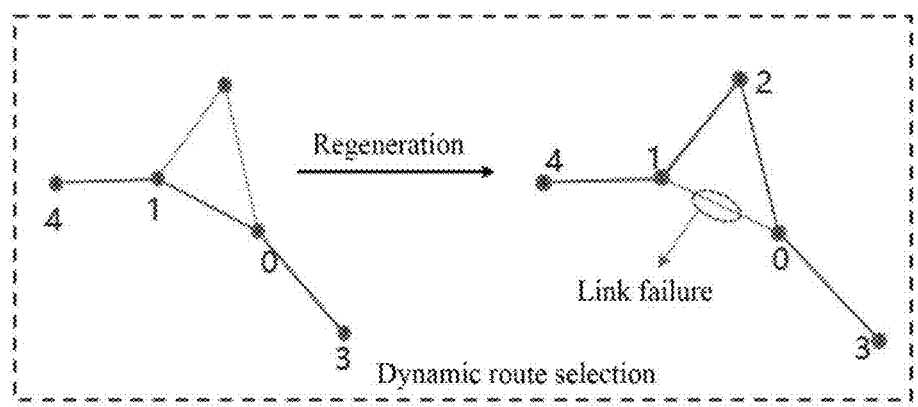
FIG. 5 is an effect diagram of route dynamic selection reconfiguration according to the present disclosure.

As shown in FIG. 3 to FIG. 5, in this embodiment, the communication network link suddenly fails due to factors such as network attacks or natural disasters, so that the route scheduling result generated by the control center is unavailable. On the one hand, the link failure information is not obtained by the control center at this time, and the route scheduling scheme cannot be regenerated because of the delay of information transmission. On the other hand, if a scheduling scheme is regenerated by the control center and then is issued to each communication node, the time period is too long to satisfy the transmission needs of the service traffic. Therefore, the method proposed by the present disclosure can quickly re-select the path for the current scheduling traffic only at the failed link node on the basis of keeping a part of the original optimal scheduling results, so as to ensure the real-time demand of the service traffic transmission. The specific process is as follows.

1) Taking into account that when a traffic is scheduled, a communication node where the traffic is located has a link failure, so that an original route path is unavailable. At this time, a current communication node acquires real-time link failure information, regards a failed link $l_{ij}$ as unreachable according to the above method, and modifies a corresponding element $a_{ij}=0$ in the adjacency matrix A and a corresponding element $distance_{ij}=\inf$ in a route distance matrix.
2) Taking into account that the time period of regenerating the global optimal scheduling scheme by the control center is relatively long, which will influence the real-time performance of the current communication node traffic transmission, the dynamic selection strategy proposed by the present disclosure is to re-select an optimal path at the failed link node in which the current communication node serves as the source node and the destination node of the service traffic remains unchanged according to the principle and the method proposed in S3, so as to achieve rapid reconstruction of the failed path.
3) Taking into account that an original route scheduling result is not completely unavailable, dynamic selection of a path is only carried out at the failed link, and a complete route path is incapable of being formed, an optimal scheduling result in S3 is combined with a reconstruction result in S4 to re-form a complete route path from a source node to a destination node of the service traffic, the complete route path is fed back to a control center, and an optimal scheduling route table S is updated.

The route dynamic selection pseudo-code is as follows:

---
Route dynamic selection pseudo-code
---
Input: the current scheduled service traffic $f_k$ and the real-time link failure information $l_{ij,failed}$;
Output: the reconfiguration path $path_{k,new}$ and the new route table $S_{new}$ of the current scheduled service traffic;
1: if $l_{ij,failed}$ =True:
2: update $a_{ij} \leftarrow a_{ij} = 0$
3: update $distance_{ij} \leftarrow distance_{ij} = \inf$
4: $path_{k,rem}$, $path_{k,failed} \leftarrow$ split($path_k$)
5: $path_{k,re\_select} \leftarrow$ Floyd ($path_{k,failed}$, D)
6: $path_{k,new} \leftarrow$ combine ($path_{k,rem}$, $path_{k,re\_select}$)
7: if $path_{k,new}$ satisfies (8)-(14):
8: update $S_{new} \leftarrow S$
9: else:
10: $f_k$ is failed
11: end if
12: else
13: pass
14: end if

---

In Embodiment 2, a service demand-driven routing scheduling and dynamic selection system for an active distribution network is provided, where the system includes:

a traffic importance evaluation module, which is configured to evaluate a physical importance index and an information importance index of each service traffic according to a physical influence and an information demand of each issued service traffic;

a fusion module, which is configured to comprehensively take into account the physical importance index and the information importance index to obtain a comprehensive service traffic importance index;

a service traffic set module, which is configured to rank the comprehensive service traffic importance index to obtain a ranked service traffic set;

a route link quantization module, which is configured to quantize the real-time performance and the reliability of each route link and generate a route distance matrix;

a route optimization generation module, which is configured to input the ranked service traffic set and the route distance matrix into a pre-constructed route scheduling optimization model, and generate an optimal route scheduling scheme of the overall service traffic based on a principle of service traffic importance and route path performance matching;

a traffic scheduling module, which is configured to schedule, by a lower router, the traffic according to the optimal route scheduling scheme;

a route dynamic selection module, which is configured to dynamically select a route path based on real-time link failure information and an original optimization scheme when there is a link failure.

In the present disclosure, a method for route dynamic selection base on real-time link failure information and an original optimization scheme provided by the present disclosure can quickly re-select the available path at the node of the failed link, and the reconstruction result can satisfy the transmission demand of the traffic, thus solving the problem of ensuring the transmission of the service traffic on demand in the event of sudden link failures.

The above are only the specific embodiments of the present disclosure. It should be pointed out that those skilled in the art can make several improvements and variations without departing from the technical principles of the present disclosure, and these improvements and variations should also be regarded as the scope of protection of the present disclosure.

What is claimed is:
1. A service demand-driven routing scheduling and dynamic selection method for an active distribution network, wherein the method comprises:
evaluating a physical importance index and an information importance index of each service traffic according to a physical influence and an information demand of each issued service traffic;
comprehensively taking into account the physical importance index and the information importance index to obtain a comprehensive service traffic importance index;
ranking the comprehensive service traffic importance index to obtain a ranked service traffic set;
quantizing the real-time performance and the reliability of each route link and generating a route distance matrix;
inputting the ranked service traffic set and the route distance matrix into a pre-constructed route scheduling optimization model, and generating an optimal route scheduling scheme of the overall service traffic based on a principle of service traffic importance and route path performance matching; and
scheduling, by a lower router, the traffic according to the optimal route scheduling scheme;
wherein evaluating a physical importance index and an information importance index of each service traffic according to a physical influence and an information demand of each issued service traffic comprises:
using an improved gravity centrality method to evaluate a physical importance, wherein an original gravity centrality formula is:

$$G(i) = \sum_{j \in N_i} \frac{ks(i)ks(j)}{d_{ij}} \quad (1)$$

where G(i) denotes an obtained node influence index, ks(i) denotes a k-shell value of a physical node i, ks(j) denotes a k-shell value of a physical node j, the k-shell value denotes the influence in the network topology, $N_i$ denotes a neighboring node set of a physical node i, and $d_{ij}$ denotes a topological distance between the physical nodes i and j;

improving the formula (1), and obtaining an improved gravity centrality formula:

$$G_P(i) = \sum_{j \in N_i} \frac{p_{i,norm}ks(i) \cdot p_{j,norm}ks(j)}{d_{ij}} \quad (2)$$

where $G_p(i)$ denotes an obtained physical node importance value, $p_{i,norm}$ denotes a power influence of the normalized traffic on the physical node i, $p_{i,norm}ks(i)$ denotes a comprehensive index of the structural influence and the physical influence of the node i in a network topology, $p_{j,norm}$ denotes a power influence of the normalized traffic on the physical node j, and $p_{j,norm}ks(j)$ denotes a comprehensive index of the structural influence and the physical influence of the node j in the network topology;

referring to formula (3) for the method of normalizing all variables to be normalized:

$$c_{norm} = (1 - X)\left(\frac{c - c_{min}}{c_{max} - c_{min}}\right) + X \quad (3)$$

where $c_{norm}$ denotes a normalized variable value, c denotes the variable to be normalized, $c_{min}$ denotes a minimum value of the variable c, $c_{max}$ denotes a maximum value of the variable c, and X denotes the corrected parameter;

using the improved gravity centrality formula (2) to denote the physical importance $I_p(k)$ of the service traffic $f_k$, as shown in formula (4):

$$I_p(k) = G_p(i) \quad (4)$$

taking into account the specific real-time demand and reliability demand of different service traffics, constructing a traffic information importance formula (5):

$$I_c(k) = \alpha_1 \frac{1}{\tau_{k,norm}} + \alpha_2 \frac{1}{e_{k,norm}} \quad (5)$$

where k denotes the number of the service traffic, $I_c(k)$ denotes the information importance index of the traffic, $\tau_{k,norm}$ denotes a normalized deadline demand of the traffic, $e_{k,norm}$ denotes a normalized bit error rate demand of the traffic, $\alpha_1$ and $\alpha_2$ denote weight coefficients which satisfy $\alpha_1 + \alpha_2 = 1$;

comprehensively taking into account the physical importance index and the information importance index to obtain a comprehensive service traffic importance index comprises:

based on a traffic physical importance $I_p(k)$ (4) and a traffic information importance (5), giving an information physical comprehensive importance index (6) of the service traffic $f_k$:

$$I_k = \beta_1 I_p(k) + \beta_2 I_c(k) \quad (6)$$

where $I_k$ denotes a comprehensive importance of each traffic taking into account both the physical importance and the information importance, and $\beta_1$ and $\beta_2$ denote weight coefficients which satisfy $\beta_1 + \beta_2 = 1$;

arranging the traffics in a traffic set to be scheduled F in a descending order according to the comprehensive importance $I_k$ of each traffic to obtain a ranked traffic set;

wherein quantizing the real-time performance and the reliability of each route link and generating a route distance matrix comprises:

abstracting an actual router as a communication node, and abstracting a link between two communication nodes as a connecting edge, wherein the communication topology is denoted as G={V,E}, V={$u_1, u_2, \ldots, u_n$} denotes a communication node set, $u_n$ denotes an n-th communication node, E={$l_{ij}|i \neq j$} denotes a communication link set, $l_{ij}$ denotes a communication link between nodes i and j, an adjacency matrix A=$[a_{ij}]_{n \times n}$ of the communication network is obtained according to the communication network topology, and when the communication nodes i and j are communicated with each other directly, $a_{ij}=1$, otherwise $a_{ij}=0$; $a_{ij}$ denotes the connectivity between nodes i and j, and n denotes a matrix dimension;

each communication link $l_{ij}$ has a link state attribute: an available link bandwidth $b_{ij}$, a link transmission delay $\tau_{ij}$ and a link transmission bit error rate $e_{ij}$, and each route link is evaluated taking into account the transmission delay and the bit error rate in the link state, and the evaluation method is shown in formula (7):

$$\text{distance}_{ij} = \begin{cases} w_1 \tau_{ij,norm} + w_2 e_{ij,norm}, & a_{ij} = 1 \\ inf, & a_{ij} = 0 \end{cases} \quad (7)$$

where $\text{distance}_{ij}$ denotes an evaluation value of each link, $\tau_{ij,norm}$ denotes a link transmission delay normalized by formula (3), $e_{ij,norm}$ denotes a link bit error rate normalized by formula (3), $w_1$ and $w_2$ denote weight coefficients which satisfy $w_1 + w_2 = 1$, inf denotes infinity, and the smaller the value $\text{distance}_{ij}$, the better the performance of the link;

calculating the route distance matrix D=$[\text{distance}_{ij}]_{n \times n}$ according to formula (7) and the adjacency matrix A of the communication network;

wherein the method further comprises:

when a traffic is scheduled, a communication node where the traffic is located having a link failure, so that an original route path is unavailable, wherein at this time, a current communication node acquires real-time link failure information, regards a failed link $l_{ij}$ as unreachable, and modifies a corresponding element $a_{ij}=0$ in the adjacency matrix A and a corresponding element $\text{distance}_{ij}=inf$ in a route distance matrix;

re-selecting an optimal path based on service traffic importance and route path performance matching, so as to achieve rapid reconstruction of a failed path;

wherein taking into account that an original route scheduling result is not completely unavailable, dynamic selection of a path is only carried out at the failed link, and a complete route path is incapable of being formed, an optimal scheduling result is combined with a reconstruction result to re-form a complete route path from a source node to a destination node of the service traffic, the complete route path is fed back to a control center, and an optimal scheduling route table S is updated;

wherein the route scheduling optimization model has an objective function of:

$$\min \frac{1}{|F|} \sum_{f_k \in F} (o_1 \tau_{k,total} + o_2 e_{k,total}) \quad (8)$$

where |F| denotes the number of traffics in the traffic set to be scheduled, $\tau_{k,total}$ denotes a total transmission delay of the service traffic $f_k$ on a complete route path, $e_{k,total}$ denotes a total bit error rate of the service traffic $f_k$ on a complete route path, and $o_1$ and $o_2$ denote weight coefficients which satisfy $o_1+o_2=1$;

the total delay and the total bit error rate of the service traffic on a complete route path are (9) and (10), respectively:

$$\tau_{k,total} = \sum_{l_{ij} \in path_k} \tau_{ij} \quad (9)$$

$$e_{k,total} = 1 - \prod_{l_{ij} \in path_k} (1 - e_{ij}) \quad (10)$$

where $l_{ij}$ denotes a link, $path_k$ denotes a complete route path of the service traffic $f_k$, $f_k$ denotes a k-th traffic to be scheduled, and F denotes a traffic set to be scheduled;

a transmission delay constraint of the service traffic is (11): each traffic arrives within the deadline;

$$\tau_{k,total} \leq \tau_k, \forall f_k \in F \quad (11)$$

where $\tau_k$ denotes a deadline of the service traffic;

a bit error rate constraint of the service traffic is (12): each traffic ensures that the total bit error rate does not exceed an allowable maximum bit error rate;

$$e_{k,total} \leq e_k, \forall f_k \in F \quad (12)$$

where $e_k$ denotes an allowable maximum bit error rate of the service traffic;

a communication link bandwidth constraint is (13): the total traffic accommodated by each link does not exceed the available link bandwidth;

$$\sum_{f_k \in F} x_k^{ij} \cdot b_k \leq b_{ij}, \forall l_{ij} \in E \quad (13)$$

where $x_k^{ij}$ denotes an indicator indicating whether the service traffic $f_k$ passes through the communication link $l_{ij}$, when the service traffic $f_k$ passes through the communication link $l_{ij}$, $x_k^{ij}=1$, otherwise, $x_k^{ij}=0$, $b_k$ denotes a bandwidth required for traffic transmission, and $b_{ij}$ denotes a total bandwidth of the $l_{ij}$;

a communication node queue constraint is (14): a length of a traffic queue in each communication node does not exceed the allowable maximum queue value;

$$\sum_{f_k \in F} v_k^i \leq q_{i,max}, \forall v_i \in V \quad (14)$$

where $u_k^i$ denotes an indicator indicating whether the service traffic $f_k$ passes through the communication node i, when the service traffic $f_k$ passes through the communication node $u_i$, $u_k^i=1$, otherwise, $u_k^i=0$, $q_{i,max}$ denotes a maximum traffic storage queue of the communication node i.

2. The service demand-driven routing scheduling and dynamic selection method for the active distribution network according to claim 1, wherein the route scheduling optimization model aims at minimizing an average transmission delay and a bit error rate of all traffics, and is constructed with constraints of a deadline, a bit error rate, a communication bandwidth and a node queue of the service traffic.

3. The service demand-driven routing scheduling and dynamic selection method for the active distribution network according to claim 1, wherein inputting the ranked service traffic set and the route distance matrix into a pre-constructed route scheduling optimization model, and generating an optimal route scheduling scheme of the overall service traffic based on a principle of service traffic importance and route path performance matching comprises:

solving a shortest path by a Floyd algorithm for each service traffic according to the principle of service traffic importance and route path performance matching, and generating a current minimum distance route path for the service traffic with a high importance; and judging a constraint condition of generating the current minimum distance route path, keeping the path satisfying the constraint in a route table, updating the route distance matrix, otherwise, considering that traffic scheduling fails, until all the traffics in the traffic set are scheduled, and obtaining the optimal route scheduling scheme.

4. A system of the service demand-driven routing scheduling and dynamic selection method for the active distribution network according to claim 1, wherein the system comprises:

a traffic importance evaluation module, which is configured to evaluate a physical importance index and an information importance index of each service traffic according to a physical influence and an information demand of each issued service traffic;

a fusion module, which is configured to comprehensively take into account the physical importance index and the information importance index to obtain a comprehensive service traffic importance index;

a service traffic set module, which is configured to rank the comprehensive service traffic importance index to obtain a ranked service traffic set;

a route link quantization module, which is configured to quantize the real-time performance and the reliability of each route link and generate a route distance matrix;

a route optimization generation module, which is configured to input the ranked service traffic set and the route distance matrix into a pre-constructed route scheduling optimization model, and generate an optimal route scheduling scheme of the overall service traffic based on a principle of service traffic importance and route path performance matching; and a traffic scheduling module, which is configured to schedule, by a lower router, the traffic according to the optimal route scheduling scheme.

5. The service demand-driven routing scheduling and dynamic selection system for the active distribution network according to claim 4, wherein the system further comprises:
a route dynamic selection module, which is configured to dynamically select a route path based on real-time link failure information and an original optimization scheme when there is a link failure.

\* \* \* \* \*